United States Patent [19]

Rummage et al.

[11] Patent Number: 5,186,223
[45] Date of Patent: Feb. 16, 1993

[54] FILLING SYSTEM

[75] Inventors: Glenn E. Rummage, Simpsonville; Philip P. Su, Greenville, both of S.C.

[73] Assignee: W. R. Grace & Co.-Conn., Duncan, S.C.

[21] Appl. No.: 816,775

[22] Filed: Jan. 2, 1992

Related U.S. Application Data

[63] Continuation of Ser. No. 614,053, Nov. 9, 1990, abandoned, which is a continuation of Ser. No. 251,156, Oct. 25, 1988, abandoned.

[51] Int. Cl.$^5$ .................. B65G 17/36; B65G 45/22; A23L 1/39
[52] U.S. Cl. .................. 141/91; 141/85; 141/100; 141/106; 141/129; 141/168; 141/171; 193/11; 198/495; 198/703; 99/360; 99/427; 426/589
[58] Field of Search .................. 141/85, 89, 91, 100, 141/104-106, 129, 168, 171; 193/11; 406/47, 48; 198/703-707, 711, 712, 494, 495; 426/402, 410, 451, 557, 589; 99/352, 359-362, 427, 443, 516

[56] References Cited

U.S. PATENT DOCUMENTS

| | | | |
|---|---|---|---|
| 1,029,273 | 6/1912 | Butler | 193/11 |
| 1,459,622 | 6/1923 | Gallucci | 193/11 |
| 1,666,647 | 4/1928 | Harber | 99/352 |
| 1,710,473 | 4/1929 | Cothay | 198/705 X |
| 1,793,246 | 2/1931 | Philips | 198/495 |
| 1,848,657 | 3/1932 | Prescott | 198/495 |
| 2,426,304 | 8/1947 | Hapman | 198/703 |
| 2,484,931 | 10/1949 | Cothay | 198/703 |
| 2,900,071 | 8/1959 | Willsey | 198/495 |
| 2,916,135 | 12/1959 | Likens, Jr. | 198/705 |
| 3,879,795 | 4/1975 | Gfeller | 141/92 |
| 4,111,109 | 9/1978 | Sakurazawa | 99/353 |
| 4,232,782 | 11/1980 | Ikeda et al. | 198/706 |
| 4,407,108 | 10/1983 | Craig | 53/451 |
| 4,549,478 | 10/1985 | Entes | 99/516 X |
| 4,562,772 | 1/1986 | Battistini | 99/516 X |
| 4,563,862 | 1/1986 | McElvy | 53/552 |
| 4,606,174 | 8/1986 | Berg | 53/451 |
| 4,617,785 | 10/1986 | Chikatani et al. | 53/562 |
| 4,747,253 | 5/1988 | Schulte | 53/433 |
| 4,768,411 | 9/1988 | Su | 83/170 |
| 4,796,748 | 1/1989 | Manning | 198/703 X |

FOREIGN PATENT DOCUMENTS

| | | | |
|---|---|---|---|
| 0249916 | 6/1926 | Italy | 99/352 |
| 52-49563 | 4/1977 | Japan | 193/11 |
| 0406038 | 7/1966 | Switzerland | 53/551 |

Primary Examiner—Henry J. Recla
Assistant Examiner—Casey Jacyma
Attorney, Agent, or Firm—William D. Lee, Jr.; Mark B. Quatt; Jennifer L. Skord

[57] ABSTRACT

An improved filling system for containers of mixtures of liquid and solid material where the liquid/solid ratio is critical is disclosed. A prior art problem was that sticky solid material would adhere to the receptacle or bucket in which it was delivered to a filling chute or funnel and it would also stick to the funnel. This problem is solved by putting the sticky solid in the buckets and by using the liquid to flush the funnel and by using an air jet to remove any remaining particles from the buckets which are upturned over the funnel. Alternately, a part of the liquid may be placed in the delivery bucket and when it is tilted or turned upside down to fill the container the remaining part of the liquid is used to rinse the receptacle. The filling system is especially useful for soups containing noodles or other pasta products.

3 Claims, 2 Drawing Sheets

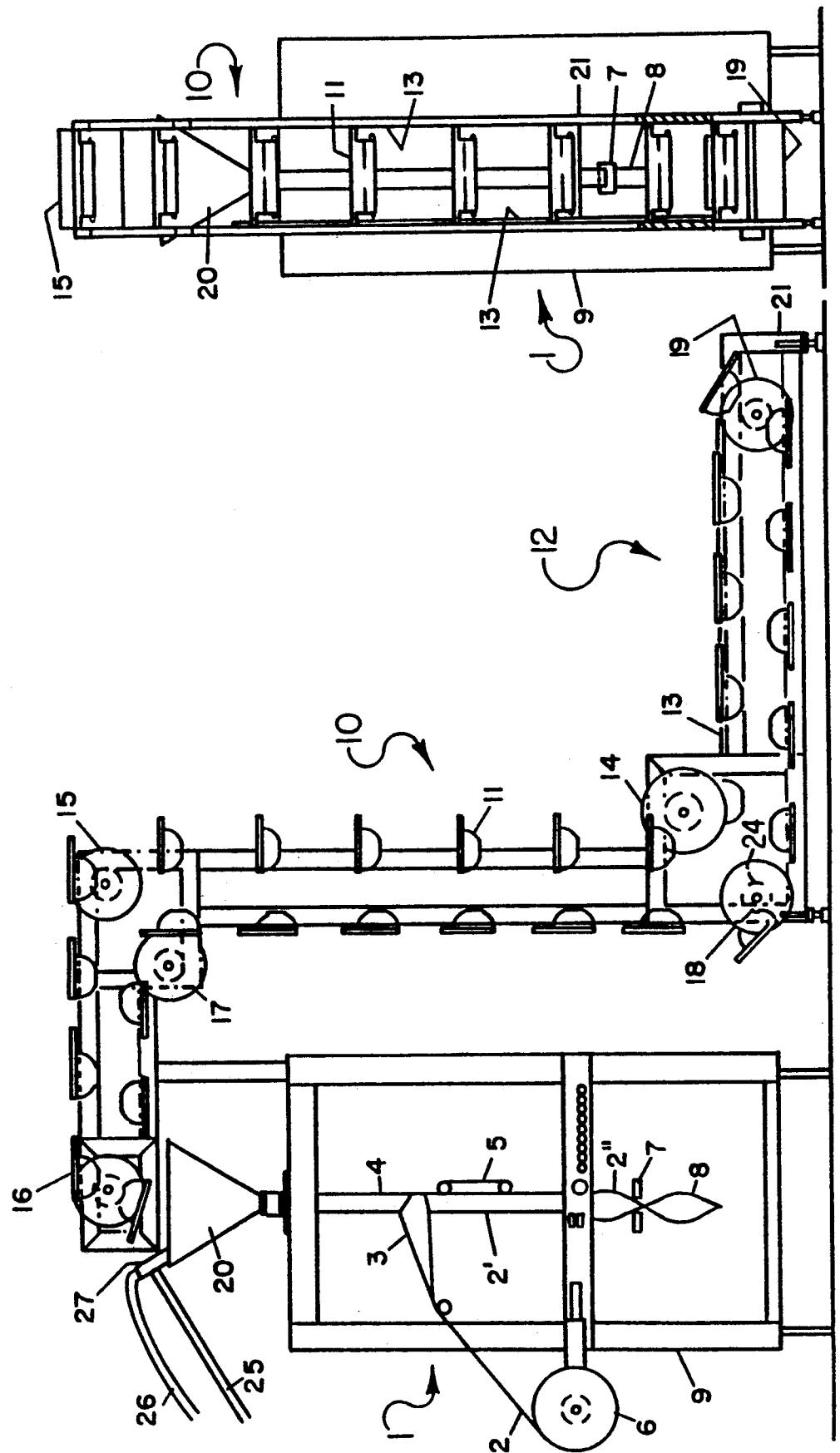

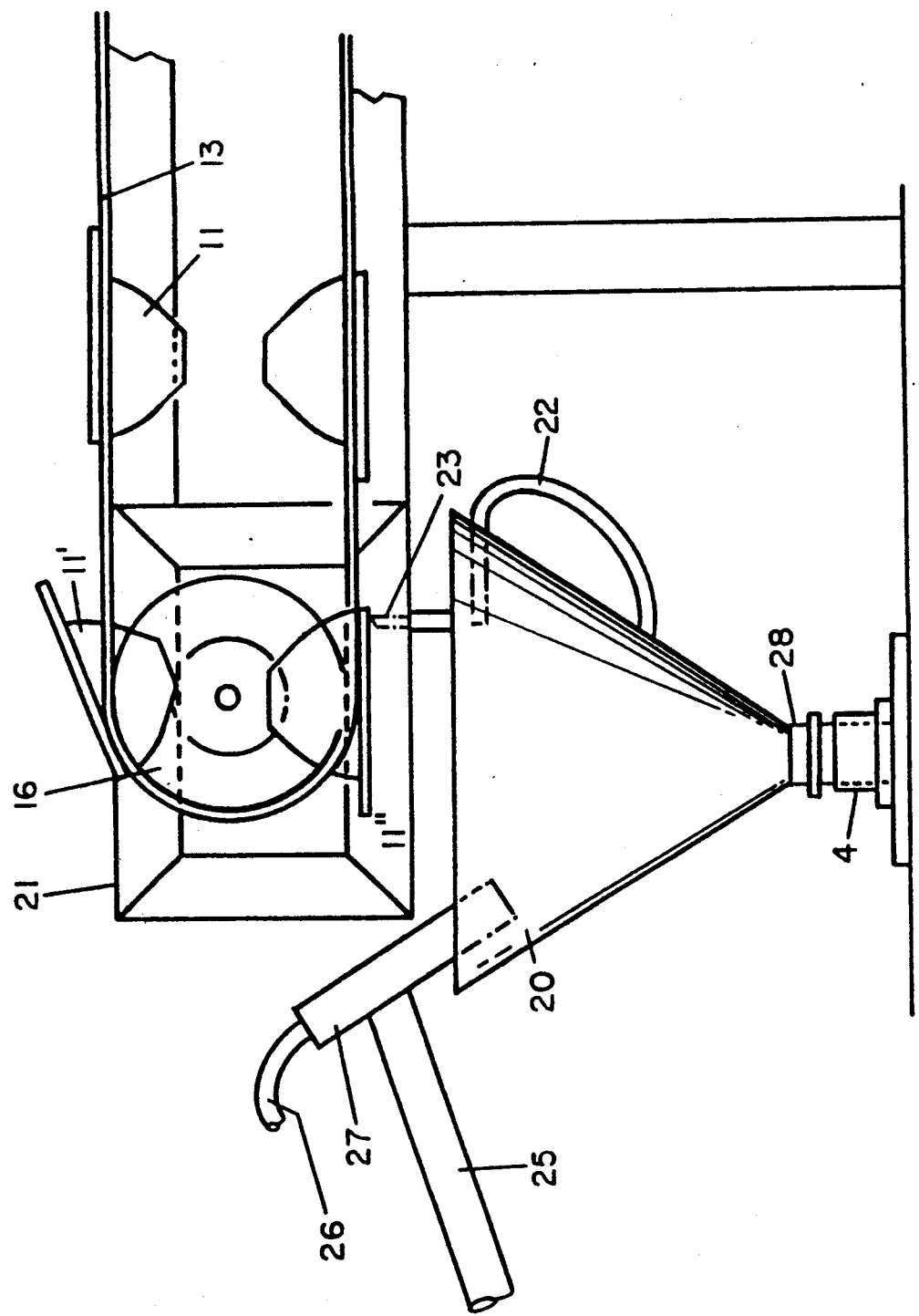

FILLING SYSTEM

This application is a continuation of application Ser. No. 07/614,053 filed on Nov. 9, 1990, now abandoned, which was a continuation of application Ser. No. 07/251,156 filed Dec. 25, 1988, now abandoned.

FIELD OF THE INVENTION

This invention relates to a method and apparatus for delivering a predetermined quantity of liquid and solid material to a container in which the liquid and solid material are packaged and to the method and apparatus for maintaining the liquid/solid ratio at the desired level in a container as it is filled. Particularly, the invention relates to an improvement in a vertical form-fill-seal process in which soups and similar food products are packaged in pouches or bags of thermoplastic film.

BACKGROUND

The form-fill-seal (FFS) systems have become an efficient and convenient way of packaging many products, particularly, products which are fluid. Since the basic container is a pouch formed of thermoplastic film, the weight and expense of metal cans is eliminated. The machines and methods basically are either horizontal form-fill-seal (HFFS) systems or vertical form-fill-seal (VFFS) systems.

Machines and processes for the forming, filling, and sealing of packages made from a continuous web or film of material are well known in the art. These machines comprise a supply of packaging film, a former and edge sealer for the forming of the film into a continuous hollow tube with a overlap edge seal, and reciprocating sealing and cutting jaws for sealing and cutting the tube into a consecutive series of sealed packages. The popularity of such machine is important due to their simplicity and speed of operations. A wide variety of articles can be packaged ranging from potato chips to tomato paste. A typical prior art VFFS machine for packaging articles such as potato chips is disclosed in U.S. Pat. No. 4,563,862 which issued on Jan. 14, 1986 to H. T. McElvy.

As mentioned above, the basic idea in a VFFS machine is to form a continuous tube by folding a continuous sheet of film around a vertically mounted former or mandrel, sealing the overlapped seam against the mandrel to form a tube, and then transversely flattening and sealing the tube at intervals as it is filled from above through the mandrel or former. Readily flowable materials such as tomato paste, liquid detergents, syrups, and liquids in general will flow reliably, and fill the package or container. However, when a solid/liquid mixture is delivered to a funnel or receiving chute above the tubular forming mandrel there will be a tendency for sticky materials such as the pasta phase of a soup to stick to the chute or to the delivery receptacle. Accordingly, it is a general object of the present invention to provide a delivery or filling system for a solid/liquid mixture wherein the solids are sticky and maintain the critical liquid/product ratio.

In one prior art system, a bucket conveyor is employed to deliver the entire charge for a container to a delivery chute and while the bucket is tilted and upturned over the delivery chute, it is re-tilted and banged against the limit stop in order to shake loose any additional solid product. However, the very sticky pasta pieces such as noodles do not, with any degree of reliability, dislodge by the banging and shaking. In addition, such banging and shaking places undue wear and stress on the equipment and is to be avoided. Accordingly, it is another object of the present invention to achieve a reliable and satisfactory method of removing sticky solids from a delivery vessel without resorting to banging or shaking of the delivery vessel.

In U.S. Pat. No. 4,606,174 which issued on Aug. 19, 1986, a VFFS process is disclosed for making packages containing a liquid product with a certain proportion of solid particles such as soup with pieces of fruit. In order to maintain the desired proportions of liquid and solid in a fast working machine, the solid and liquid parts are fed separately by means of two filling pipes and the feeding of the liquid contents ends only after the feeding of the solid particles has ended. However, in this method, the solid particle mix has to be pumped through a double walled pipe which extends down into the forming mandrel thus presenting a complicated arrangement and the associated problems of pumping a liquid with a high proportion of solids. Accordingly, it is another object of the present invention to present a method of filling which avoids the necessity of pumping a mixture containing a high proportion of solids.

Other form-fill-seal devices of interest include U.S. Pat. No. 4,407,108 which issued to S. R. Craig on Oct. 4, 1983; U.S. Pat, No. 4,617,785 which issued on Oct. 21, 1986 to H. Chikatani et al; and U.S. Pat. No. 4,768,411 which issued on Sep. 6, 1988 to Philip Su.

The objects mentioned in the foregoing paragraphs are achieved by the invention which is described below.

SUMMARY OF THE INVENTION

In one aspect the present invention is a filling system where in the process of filling a container with a two phase mixture of liquid and solid wherein the solid is sticky and tends to stick to the filling guides, chutes, or funnels there is an improvement comprising first dispensing all the solids into the guide or chute with none or a part of the liquids and then dispensing the remaining part of the liquid phase to wash any remaining solids from the chute into the container.

In another aspect the present invention is a filling system having a bucket conveyor for delivering a predetermined quantity of a mixture of liquid and solid material to a receiving chute and inverting or turning the bucket upside down in which the improvement comprises nozzle means for directing a measured quantity of liquid into the interior of the upside down bucket; and, means for delivering a measured quantity of liquid to the nozzle means.

In still another aspect, the present invention is an improved filling system having a bucket conveyor for delivering a predetermined quantity of a mixture of liquid and solid material to a receiving chute or funnel or guide from a bucket filling station comprising a conveyor frame; chain mounting and driving means mounted within the frame; a plurality of buckets mounted on said chain, said buckets being pivotally mounted to remain upright on their run from the filling station to the delivery chute and to turn upside down over the filling chute; rinse means to deliver a metered quantity of fluid to the interior of the bucket as it is upside down over the receiving chute to remove solids which may cling to the bucket whereby any solid material which has a tendency to stick or cling to the bucket is removed.

In yet another aspect, the invention is an improved filling process for delivering a predetermined quantity of a mixture of solid and liquid material having a preselected solid/liquid ratio to a receiving chute from which containers are filled comprising the steps of filling a bucket with all the solid material desired for one container and with part of the liquid desired for said container; conveying said bucket to a position above the receiving chute; tilting said bucket so that its contents can fall into said receiving chute; and, rinsing said bucket while tilted with the remaining part of the liquid which is to fill said container whereby the liquid/solid ratio in the filled container is the pre-selected ratio. The method may include a step wherein only a portion of the remaining part of the liquid is used to rinse the bucket and include the further step of rinsing the receiving chute with the remaining portion of the liquid. In addition to rinsing the bucket with a portion of the filling fluid, an air stream may also be used following the rinse by the filling fluid to dislodge any additional particles which have not been removed. Further, the method may include the steps of continuously moving the bucket while upside down over the funnel and directing the spray or stream of liquid to the interior surface of the leading edge of the bucket so that as the upturned bucket passes over the liquid stream or spray it is rinsed of solids.

In a further aspect, the invention includes the method wherein a food product is packaged and the food product is a soup having pasta such as noodles.

DESCRIPTION OF THE DRAWINGS

In the drawings which are appended hereto and made a part of this disclosure:

FIG. 1 is a side elevation view showing a preferred embodiment of an apparatus according to the present invention and representing, in a schematic form, a preferred method according to the present invention;

FIG. 2 is a view looking from the right hand side of FIG. 1; and,

FIG. 3 is an enlarged portion of FIG. 1 showing in greater detail a section through the receiving chute, rinse nozzles, and bucket conveyor of the preferred embodiment.

DETAILED DESCRIPTION

The present invention is especially useful for loading a vertical-form-fill-seal (VFFS) machine such as the VFFS machine 1 schematically represented in the left hand side of FIG. 1. The machine 1 is carried by support frame 9 and forms a flat, continuous roll 6 of packaging material 2 into tube 2', seals the bottom with transverse seal bars 7 thereby forming bag or pouch to 2", dispenses product (not shown) through the tubular former and filler 4 around which the tube 2' has been formed, and when the product is fed into the bag or pouch to 2" the top of the bag is sealed to make resulting filled bag or pouch 8.

These VFFS machines have particular advantages when used with dusty, flowable, toxic, or other hard to handle products because the portion of the machine which dispenses the product is enclosed by the packaging material when the bag or pouch is formed. A principal drawback to the VFFS is the difficulty of proportioning sticky, hard-to-handle materials into the bag with both accuracy and speed. While many improvements in materials and techniques have matured over the years, the basic concept of a VFFS machine has remained relatively unchanged for some period of time. Generally, a roll of packaging material is formed into a tube, the edges of the packaging material are fastened as by roller sealer represented by sealer 5 in FIG. 1, the bottom of the tube of packaging material is closed as by transverse sealer 7 to form a bag, particularly where liquid material is injected into the bag, conveniently by a funnel or receiving chute 20, until the desired quantity is dispensed, the top of the bag is sealed, again as by sealer 7, and cut from the tube of following packaging material, the filled bag 8 is removed from the apparatus and the process continues with the next bag. Further, descriptions of such machines are available from U.S. Pat. No. 4,407,108 (S. R. Craig, Oct. 4, 1983); U.S. Pat. No. 4,563,862 (H. T. McElvy, Jan. 14, 1986); and, U.S. Pat. No. 4,606,174 (R. Berg, Aug. 19, 1986) all of which are incorporated herein by reference.

The present invention is particularly useful in solving the problem of rapidly handling sticky products, particularly, products having both a liquid and solid phase such as soups, paste, dressings and the like. The present invention finds a particularly advantageous application where freshly cooked, hot soups are packaged quickly in plastic pouches and rapidly cooled to preserve their fresh cooked flavor. In this application, the soup is kettle cooked and the noodles are removed in a drain basket and portioned into the buckets 11 at loading station 12. The remaining liquid phase is pumped through pipe 25 to nozzle 27 where it rejoins the noodles in the correct proportions as it is packed.

Applicants have surprisingly discovered a solution to the problem of maintaining desired liquid/solid proportions and to further understand the solution attention is first directed to the right hand side of FIG. 1 where bucket conveyor 10 is shown. Bucket conveyor 10 comprises conveyor frame 21 on are mounted turn rollers 14, 15, 16, 17, 18 and 19. Buckets 11 which are pivotally mounted on conveyor between the pair of chains 13 so that they will remain upright on their run from filling station 12 to receiving chute or funnel 20. The conveyor comprises essentially a pair of parallel chains 13 carried by the turn rollers so that as the buckets 13 negotiate their turn around turn rollers 14 and 15 they remain upright and do not spill their contents, that is, a "ferris-wheel" type of mounting is employed. The conveyor is driven and controlled by the controlled drive means 24 incorporated with turn roller 18 which also functions as a drive roller.

The buckets 11 are preferably constructed of a material having a very smooth surface such as polished stainless steel or a plastic material. An interior surface coating of a "nonstick" material such as Teflon is desirable to reduce any tendency of the solids to stick to the bucket. Such coatings on the funnels or chutes may also be desirable.

In a preferred embodiment of the invention, at filling station 12 each bucket 11 will be filled with all the desired charge of solid material such as pasta or noodles without the addition of liquids. In an alternate embodiment along with the solid phase is included a part of the liquid charge. All the liquid charge or the remaining liquid charge will be added later. When part of the liquid is added at station 12, preferably the amount added is sufficient to suspend the solids therein and make the solid particles flowable. Whether it is an optimum dispensing condition to add part of all of the liquid at filling station 12 and part of the liquid later can readily be determined for each particular product which is to be packaged by varying the ratio at the beginning of each run of different products. Thus, the pre-selected part to include in the bucket, if any, and part to use as described below is easily chosen.

After leaving station 12 and moving upwardly and across turn roller 15, turn roller 16 is encountered and at this point reference is made to FIG. 3 which is an enlarged representation of a partial section through the funnel 20 to show nozzle 23 and supply line 22 which in a preferred embodiment will discharge a jet or blast of compressed air. A reservoir of liquid such as a cooking kettle or holding tank and a cylinder and piston pump where each stroke delivers the preselected quantity of liquid feed pipe 25 and the reservoir and pump are not shown as these can be readily arranged by the ordinarily skilled technician. As the buckets 11 enter and are contacted by turn roller 16, a lock mechanism on the pivot supports is actuated to prevent pivotal motion of the buckets 11 so that they will tilt as represented by bucket 11' and turn upside down as bucket 11" is represented. Such lock mechanisms are well known in the art and may consist of a snap latch which is pushed down as the bucket engages roller 16 and is released as it completes the run at roller 19. Such latches, actuating mechanisms, and releases are well known in the art and can be readily supplied by the ordinarily skilled mechanic.

In a preferred embodiment where the buckets 11 contain only the solid phase comprising sticky solids only, as the bucket 11' is inverted to bucket position 11" all the solids fall into funnel 20 and tend to collect at neck 28. At this point, valve controlled flush nozzle 27 is actuated by means of pneumatic line 26 and the full charge of the liquid phase is released and will tend to initially float and lift the solid and then as all the charge is released the weight of the fluid will drive the solids downwardly into former chute 4 and further downwardly to the bag 2". At the same time compressed air is released through line 22 and nozzle 23 which directs a jet of air against inverted bucket 11" to remove any solids remaining in bucket 11".

In an alternate embodiment where the bucket 11 is loaded with a mix of solids and liquids at loading station 12, as the bucket 11" is turned upside down above the funnel 20 its contents are emptied. At this point, the remaining part of the liquid phase of the charge which bucket 11" delivers is released through supply line 22, which is now a liquid supply line, and directed by nozzle 23 against the interior of the bucket 11". The leading edge of the bucket 11" receives on its interior surface the first part of the spray or rinse of the product fluid and as the upturned bucket 11" continues to move towards the right its entire surface is sprayed or rinsed clean by the fluid phase thus cleansing the bucket.

In some instances for unduly sticky products, a pneumatic or air nozzle can be positioned immediately to the right of nozzle 23 so that a stream of compressed air follows the liquid stream to further aid in dislodging all particles. In the view shown in FIG. 3 only one nozzle 23 is visible; however, a number of nozzles can be used or a single nozzle with one spray head to spread the spray of fluid evenly across the width of the bucket can be employed. All of these variations on the preferred embodiment fall within the scope of the invention. The bucket can be completely turned over or tilted at an angle as desired and the angle of the nozzle 23 can be accordingly adjusted. Generally, the bucket will have to be tilted thoroughly at least a 90° turn, a 180° turn representing an upside down bucket. Furthermore, in this alternate embodiment a portion of the liquid charge can be delivered through pipe 25 and nozzle 27.

An additional final rinse means and method not shown but readily understood from the following description is that a nozzle similar to nozzle 27 can be placed in the funnel with a circular spray head to spray a circular spray downwardly to use a portion of the liquid phase to finally clear the funnel 20 of any particles which may have been left stuck to the interior funnel wall. In addition, a circular air blast also may be employed downwardly into the funnel.

Furthermore, in some packages for some mixes it may be desirable that one phase not be added until immediately before the package is sealed and thus the present inventions contemplates the use of more than one liquid which can be employed as a rinse. For example, in the instance where pouches of salad dressing containing vinegar, oil, and herb and spice particles is being packaged both oil and vinegar can be sprayed with the vinegar perhaps following to make a final rinse. Many combinations are possible and the description hereinabove of the preferred embodiment is given by way of illustration since numerous changes and modifications well within the spirit and scope of the invention could become apparent to those already skilled in the art in view of the description given. The invention is only limited by the scope of the claims appended hereto.

After the receiving chute or funnel 20 has received its final rinse or air blast the complete product falls through the former tube 4 and into the pouch or bag 2". The proceeding pouch or bag 8 is removed and the bag 2" moves downwardly to be sealed and severed by seal bars 7. One sealing and severing device which is particularly appropriate here is that disclosed in U.S. Pat. No. 4,768,411 (Philip Su, Sep. 6, 1988) which is incorporated herein by reference.

Having thus described our invention,
We claim:

1. A food preparation and package filling system for food products which are a mixture of as liquid and a solid phase such as soups, stews, or the like comprising:
    a) receiving chute means;
    b) bucket conveyor means for delivering a predetermined quantity of said mixture of a liquid and solid phase such as cooked soup, solids and stock to said receiving chute means, said mixture having less liquid or stock than its final desired mixture;
    c) means for turning the buckets in said conveyor means substantially upside down to empty them into said receiving chute means;
    d) nozzle means for directing and delivering a measured quantity of the liquid phase or soup stock of said mixture into the receiving chute means;
    e) means for delivering a measured quantity of said liquid phase to said nozzle means whereby the liquid or stock upon being discharged from the nozzle removes solids clinging to the receiving chute and the liquid and removed solids leave the chute as part of said mixture in the final desired ratio of solids to liquid or stock; and
    f) means for packaging said final mixture in containers which are filled directly from said chute.

2. The filling system of claim 1 which includes rinse means to deliver a metered quantity of fluid to the receiving chute to remove solids which may cling to the bucket whereby such solids fall into said chute and become part of said mixture.

3. The filling system of claim 2 including pneumatic means to deliver a blast of air or gas to the interior of the substantially upside down bucket to remove any solid material remaining after the fluid from the rinse means has been discharged.

* * * * *

UNITED STATES PATENT AND TRADEMARK OFFICE
CERTIFICATE OF CORRECTION

PATENT NO. : 5,186,223

DATED : February 16, 1993

INVENTOR(S) : Glenn E. Rummage and Philip P. Su

It is certified that error appears in the above-identified patent and that said Letters Patent is hereby corrected as shown below:

In column 6, line 59 of the claims, insert --interior of the buckets as they are upside down over the-- after "the".

Signed and Sealed this

Twenty-eighth Day of December, 1993

Attest:

BRUCE LEHMAN

Attesting Officer          Commissioner of Patents and Trademarks